United States Patent [19]

Kersting

[11] Patent Number: 4,938,511
[45] Date of Patent: Jul. 3, 1990

[54] TUBE COUPLING

[75] Inventor: Wolfgang Kersting, Nendeln, Liechtenstein

[73] Assignee: Econt Corporation Limited, Switzerland

[21] Appl. No.: 208,078

[22] Filed: Jun. 17, 1988

[51] Int. Cl.⁵ ............................................. F16L 37/08
[52] U.S. Cl. .................................. 285/312; 285/423;
            285/915; 411/383; 411/411; 411/908
[58] Field of Search ............... 285/312, 423, 906, 392,
            285/915, 490; 411/383, 411, 438, 908

[56]  References Cited
   U.S. PATENT DOCUMENTS

| | | | |
|---|---|---|---|
| 720,580 | 2/1903 | Greenfield | 411/411 |
| 1,512,895 | 10/1924 | Kraft | 285/312 |
| 2,804,320 | 8/1957 | Pearson | 285/392 |
| 3,245,701 | 4/1966 | Leopold et al. | 285/915 X |
| 3,264,013 | 8/1966 | Richardson et al. | 285/423 X |
| 3,784,239 | 1/1974 | Carter | 285/423 X |
| 4,059,296 | 11/1977 | Panourgias | 285/423 X |
| 4,093,280 | 6/1978 | Yoshizawa | 285/915 X |
| 4,126,338 | 11/1978 | Coel et al. | 285/392 |
| 4,222,593 | 9/1980 | Lauffenburger | 285/312 X |
| 4,398,754 | 8/1983 | Caroleo | 285/915 |

Primary Examiner—Dave W. Arola
Attorney, Agent, or Firm—Wood, Phillips, Mason, Recktenwald & Vansanten

[57]  ABSTRACT

For the connection of two tubes (1, 2), one coupling piece (3, 4), consisting of an external thread (7) adhered, vulcanized or fused onto the end of the tube and a pipe coupling (8) screwed onto this by means of a slide adhesive is each connected with the tube ends. By means of the one coupling piece (4), a coupling lock (5) is slid from behind, which, by means of a flange (12), abuts on a shoulder unit (11). On the free end, the coupling lock (5) supports two swivelable levers (15) with eccentric cams (16), which abut on the shoulder unit (10) of the other coupling piece (3) and press this axially against the first coupling piece (4). By means of this construction, a non-tapered cross-sectional area is achieved in the tube coupling.

9 Claims, 1 Drawing Sheet

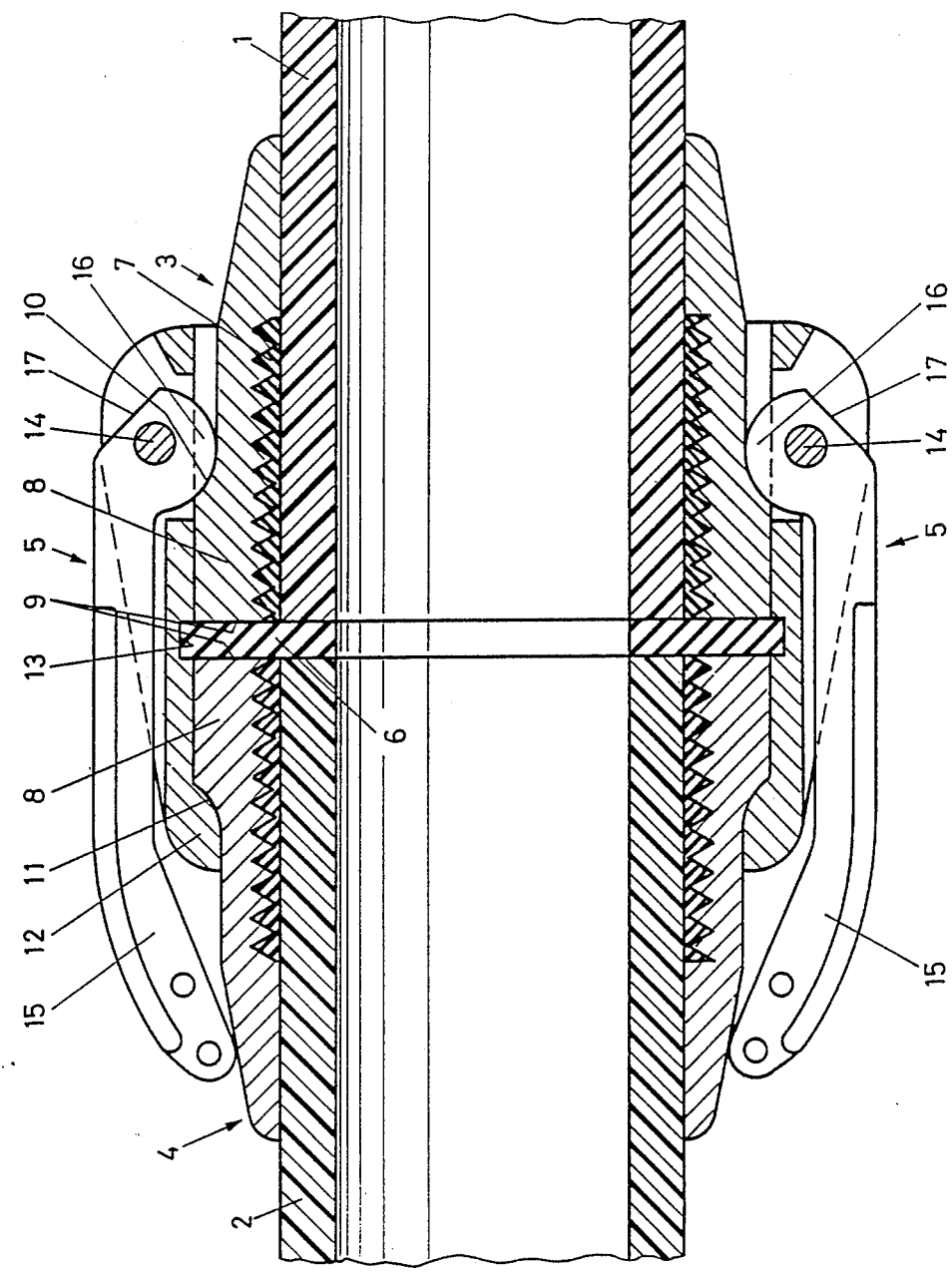

TUBE COUPLING

BACKGROUND OF THE INVENTION

In known tube couplings, a support sleeve with serrated grooves is inserted into the end of the tube, against which the end of the tube is radially pressed from the outside. The disadvantage of these tube couplings consists of the fact that the cross-sectional area of the tube is tapered with the support sleeve.

SUMMARY OF THE INVENTION

The task which forms the basis of the invention is that of eliminating this disadvantage. This task is solved by means of the characteristics stated in claim 1.

In the following, an example of execution of the invention will be illustrated by means of the diagram. The sole FIG. depicts an axial section through a tube coupling in accordance with the invention.

BRIEF DESCRIPTION OF THE DRAWINGS

The depicted tube coupling connects the ends of two tubes (1, 2). It comprises one coupling piece each (3, 4) attached at the ends of the tube (1, 2), and a coupling lock (5) connecting the coupling pieces (3, 4) with one another, as well as an elastomer sealing ring (6). Each coupling piece (3, 4) consists of an external thread (7) adhered or vulcanized on the external periphery of the tube (1, 2), and a pipe coupling (8), of malleable iron, for example, which is screwed onto the external thread (7) with a slide adhesive. The external thread (7) consists either of a bar adhered or vulcanized helically onto the end of the tube, with a triangular cross-section of plastic or rubber, particularly of an elastomer, or of a longitudinally-slotted sleeve of plastic or rubber. Contact adhesive is suited for use as an adhesive. In a thermoplastic tube (1, 2), the external thread (7) can likewise consist of thermoplast and be fused on.

The pipe coupling (8) has an internal thread corresponding to the external thread (7). In the form of execution depicted, the external thread (7) is shorter than the pipe coupling (8), but can, however, also extend over the entire length of the same, which increases the strength of the connection between the pipe coupling (8) and the tube (1, 2). The pipe coupling (8) has a level frontal side (9) for fitting to the sealing ring (6), and a shoulder unit (10, 11) turned away from the frontal side (9) for the axial pressing of both coupling pieces (3,4) against one another by means of the coupling lock (5).

The coupling lock (5) is manufactured from aluminum or malleable cast iron, slid over the coupling piece (4) from behind, and abuts with a narrowed flange (12) on the shoulder unit (11) of the same. It has a peripheral groove (13) in which the sealing ring (6) rests. On its free end, two levers (15) of malleable cast iron are supported on bolts (14) in a swivelable manner. These have an eccentric cam (16), which abuts against the shoulder unit (10) of the sealing piece (3), and presses this, in the depicted position of the lever (15), axially against the sealing piece (3). When the levers (15) are open, a flattening (17) aligns with the internal diameter of the coupling lock (5), so that the coupling piece (3) can be removed or inserted.

For the purpose of joining against the shoulder unit (11) of the coupling piece (4), a second pair of levers can, instead of the flange (12), also be positioned on the coupling lock corresponding to the lever (15) with cams and flattenings constructed analogously to the grooves (16) and flattenings (17). This has the advantage that the coupling lock does not need to be slid onto the tube (2) before the mounting of the coupling piece (4). For the same purpose, the coupling lock (5) can also be constructed in two parts, if it is divided, for example, in the image plane of the FIG., and is suitably held together by means of the bolts (14) which are constructed as screws.

The tube coupling depicted has a non-tapered cross-sectional area. By means of the adhered, vulcanized or fused external thread (7), and the pipe coupling (8) screwed onto the same, a strong, reliable connection of the pipe coupling (8) with the tube (1, 2) is achieved.

I claim:

1. A hose coupling comprising:
   a first flexible hose having a first end;
   a second flexible hose having a second end; and sealing means between said ends;
   a first external thread bonded onto the external surface of said first hose adjacent its first end;
   a second external thread bonded onto the external surface of said second hose adjacent its second end;
   a first tubular internally threaded coupling piece threaded onto and adhesively bonded to said first external thread, said first coupling piece having a first shoulder facing away from said first end;
   a second tubular internally threaded coupling piece threaded onto and adhesively bonded to said second external thread, said second coupling piece having a second shoulder facing away from said second end; and
   a coupling lock having an abutting means abutting, in the coupled state of the hose coupling, against said first shoulder, and a pivotable cam on a lever abutting, in the coupled state of the hose coupling, against said second shoulder and urging said first and second coupling pieces axially toward each other and said hose end against said sealing means, the lever being pivotable into a position in which said second hose with said second coupling piece is axially removable from said coupling lock.

2. A coupling according to claim 1 wherein said coupling lock is axially movable relative to said first coupling piece.

3. A coupling according to claim 1 wherein said coupling lock is separable from said first coupling piece by axial movement relative thereto.

4. A coupling according to claim 1 wherein said first shoulder axially coincides with said first external thread and said second shoulder axially coincides with said second external thread.

5. The coupling in accordance with claim 1 wherein said external thread (7) is vulcanized onto the end of the tube (1, 2).

6. The coupling in accordance with claim 1 wherein said external thread (7) is fused onto the end of the tube (1, 2).

7. A coupling in accordance with claim 1, characterized in that the external thread (7) consists of a bar with a triangular cross-section of rubber, which is wound helically around the end of the tube.

8. A coupling in accordance with claim 7, characterized in that the rubber is an elastomer.

9. A coupling in accordance with claim 1 characterized in that the external thread (7) consists of a longitudinally-slotted sleeve of rubber.

* * * * *